US011592530B2

(12) United States Patent
McCord et al.

(10) Patent No.: US 11,592,530 B2
(45) Date of Patent: Feb. 28, 2023

(54) DETECTOR DESIGNS FOR IMPROVED RESOLUTION IN LIDAR SYSTEMS

(71) Applicant: Cepton Technologies, Inc., San Jose, CA (US)

(72) Inventors: Mark A. McCord, Los Gatos, CA (US); Jun Pei, Saratoga, CA (US); Dongyi Liao, Mountain View, CA (US)

(73) Assignee: Cepton Technologies, Inc., San Jose, CA (US)

( * ) Notice: Subject to any disclaimer, the term of this patent is extended or adjusted under 35 U.S.C. 154(b) by 1076 days.

(21) Appl. No.: 16/203,430

(22) Filed: Nov. 28, 2018

(65) Prior Publication Data

US 2019/0162858 A1 May 30, 2019

Related U.S. Application Data

(60) Provisional application No. 62/593,105, filed on Nov. 30, 2017.

(51) Int. Cl.
*G01S 17/89* (2020.01)
*G01S 17/10* (2020.01)
(Continued)

(52) U.S. Cl.
CPC ........... *G01S 7/4815* (2013.01); *G01J 1/0411* (2013.01); *G01S 7/4814* (2013.01); *G01S 17/04* (2020.01);
(Continued)

(58) Field of Classification Search
CPC ...... G01S 7/481; G01S 7/4814; G01S 7/4815; G01S 7/4817; G01S 7/484; G01S 7/4865;
(Continued)

(56) References Cited

U.S. PATENT DOCUMENTS 4,203,652 A 5/1980 Hanada
5,465,178 A 11/1995 Nakai et al.
(Continued)

FOREIGN PATENT DOCUMENTS

CN 207037244 U 2/2018
JP S53-100842 A 9/1978
(Continued)

OTHER PUBLICATIONS

PCT/US2018/062994, "International Search Report and Written Opinion", dated Apr. 24, 2019, 11 pages.
(Continued)

*Primary Examiner* — John R Lee
(74) *Attorney, Agent, or Firm* — Kilpatrick Townsend & Stockton LLP

(57) ABSTRACT

A lidar system includes a laser source, an emission lens configured to collimate and direct a laser beam emitted by the laser source, a receiving lens configured to receive and focus a return laser beam reflected off of one or more objects to a return beam spot at a focal plane of the receiving lens, and a detector including a plurality of photo sensors arranged as an array at the focal plane of the receiving lens. Each photo sensor has a respective sensing area and is configured to receive and detect a respective portion of the return laser beam. The lidar system further includes a processor configured to determine a respective time of flight for each respective portion of the return laser beam, and construct a three-dimensional image of the one or more objects based on the respective time of flight for each respective portion of the return laser beam.

22 Claims, 14 Drawing Sheets

(51) Int. Cl.
  *G01S 17/02* (2020.01)
  *G02B 27/30* (2006.01)
  *G02B 27/09* (2006.01)
  *G02B 7/04* (2021.01)
  *G01S 7/481* (2006.01)
  *G01S 17/04* (2020.01)
  *G01S 17/26* (2020.01)
  *G01J 1/04* (2006.01)

(52) U.S. Cl.
  CPC .............. *G01S 17/26* (2020.01); *G01S 17/89* (2013.01); *G02B 7/04* (2013.01); *G02B 27/0966* (2013.01); *G02B 27/30* (2013.01)

(58) Field of Classification Search
  CPC .......... G01S 17/00; G01S 17/02; G01S 17/04; G01S 17/06; G01S 17/08; G01S 17/26; G01S 17/89; G02B 3/06; G02B 7/02; G02B 7/04; G02B 27/0966; G02B 27/30; G01J 1/0411
  See application file for complete search history.

(56) References Cited

U.S. PATENT DOCUMENTS

| | | | |
|---|---|---|---|
| 8,836,922 B1 | 9/2014 | Pennecot et al. | |
| 9,086,273 B1 | 7/2015 | Gruver et al. | |
| 9,709,677 B2* | 7/2017 | Eisele | G01C 3/08 |
| 9,791,555 B2* | 10/2017 | Zhu | G01S 17/10 |
| 9,823,118 B2* | 11/2017 | Doylend | G01S 17/10 |
| 9,823,353 B2* | 11/2017 | Eichenholz | H01S 3/094042 |
| 10,036,958 B2 | 7/2018 | Furuya et al. | |
| 10,063,849 B2* | 8/2018 | Pacala | G02B 3/0056 |
| 10,306,209 B2* | 5/2019 | Ko | H04N 13/286 |
| 11,137,480 B2* | 10/2021 | Hall | G01S 7/4815 |
| 11,294,035 B2* | 4/2022 | Gao | G01S 7/4813 |
| 11,300,684 B2* | 4/2022 | Pei | B60R 1/00 |
| 2002/0043561 A1 | 4/2002 | Tsikos et al. | |
| 2002/0135831 A1 | 9/2002 | Park | |
| 2003/0042303 A1 | 3/2003 | Tsikos et al. | |
| 2003/0071124 A1 | 4/2003 | Tsikos et al. | |
| 2003/0080190 A1 | 5/2003 | Tsikos et al. | |
| 2006/0221459 A1 | 10/2006 | Sagan | |
| 2007/0181810 A1 | 8/2007 | Tan et al. | |
| 2012/0057345 A1 | 3/2012 | Kuchibhotla | |
| 2012/0275028 A1 | 11/2012 | Soskind et al. | |
| 2014/0198308 A1 | 7/2014 | Kim | |
| 2015/0025843 A1 | 1/2015 | Takemura | |
| 2015/0131080 A1 | 5/2015 | Retterath et al. | |
| 2016/0327779 A1* | 11/2016 | Hillman | G02B 23/04 |
| 2017/0131390 A1* | 5/2017 | Heinonen | H01L 27/14609 |
| 2017/0235057 A1 | 8/2017 | Hemenway et al. | |
| 2017/0244955 A1* | 8/2017 | Shpunt | H04N 13/363 |
| 2017/0269198 A1* | 9/2017 | Hall | G01S 7/484 |
| 2017/0307759 A1* | 10/2017 | Pei | B60R 11/04 |
| 2017/0314764 A1 | 11/2017 | Kishikawa et al. | |
| 2018/0095165 A1 | 4/2018 | Cohen et al. | |
| 2018/0348344 A1 | 12/2018 | Wyrwas et al. | |
| 2019/0018108 A1* | 1/2019 | Gao | G01S 7/4814 |
| 2019/0162857 A1 | 5/2019 | McCord et al. | |
| 2019/0162858 A1* | 5/2019 | McCord | G02B 7/04 |
| 2019/0301700 A1 | 10/2019 | Yamazumi et al. | |
| 2022/0091236 A1* | 3/2022 | McCord | G01S 7/4804 |

FOREIGN PATENT DOCUMENTS

| | | |
|---|---|---|
| JP | H8-307006 A | 11/1996 |
| JP | H11-118419 A | 4/1999 |
| JP | 2000-098027 A | 4/2000 |
| JP | 2003-028960 A | 1/2003 |
| JP | 2007-214564 A | 8/2007 |
| JP | 2016-109517 A | 6/2016 |

OTHER PUBLICATIONS

PCT/US2018/062994, "Invitation to Pay Additional Fees and, Where Applicable, Protest Fee", dated Feb. 28, 2019, 3 pages.
Supplementary European Search Report dated Jul. 13, 2021 in corresponding European Patent Application No. 18884348.6 (twelve pages).
Non-Final Office Action dated May 27, 2022 in related U.S. Appl. No. 16/203,422 (44 pages).
Notice of Allowance dated Oct. 19, 2022 in corresponding U.S. Appl. No. 16/203,422 (twelve pages).
Japanese Office Action dated Dec. 9, 2022 in related Japanese Application No. 2020-529120.

* cited by examiner

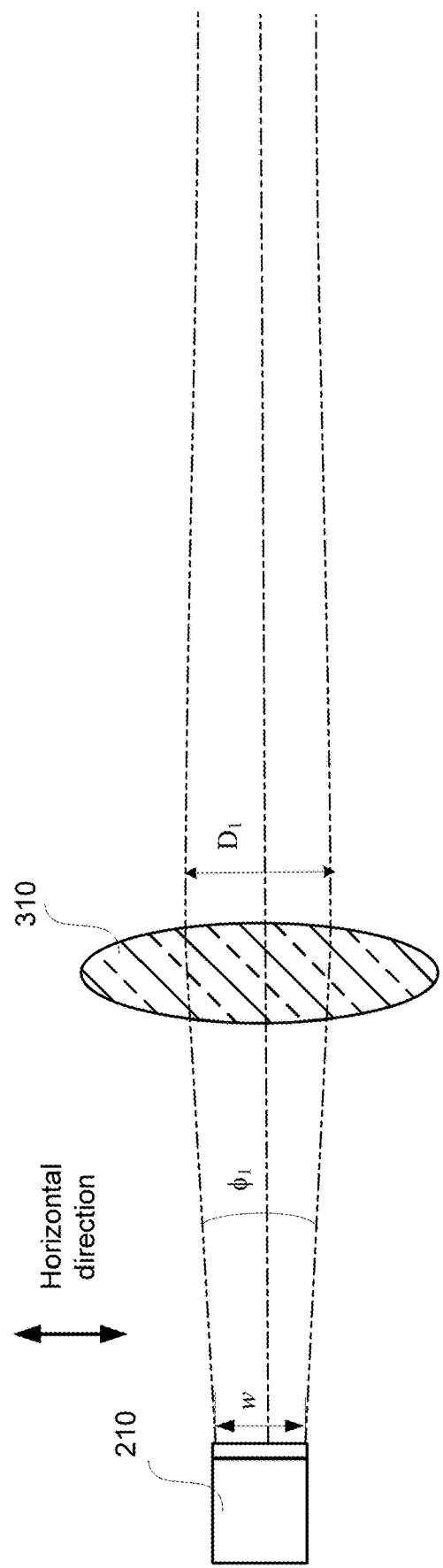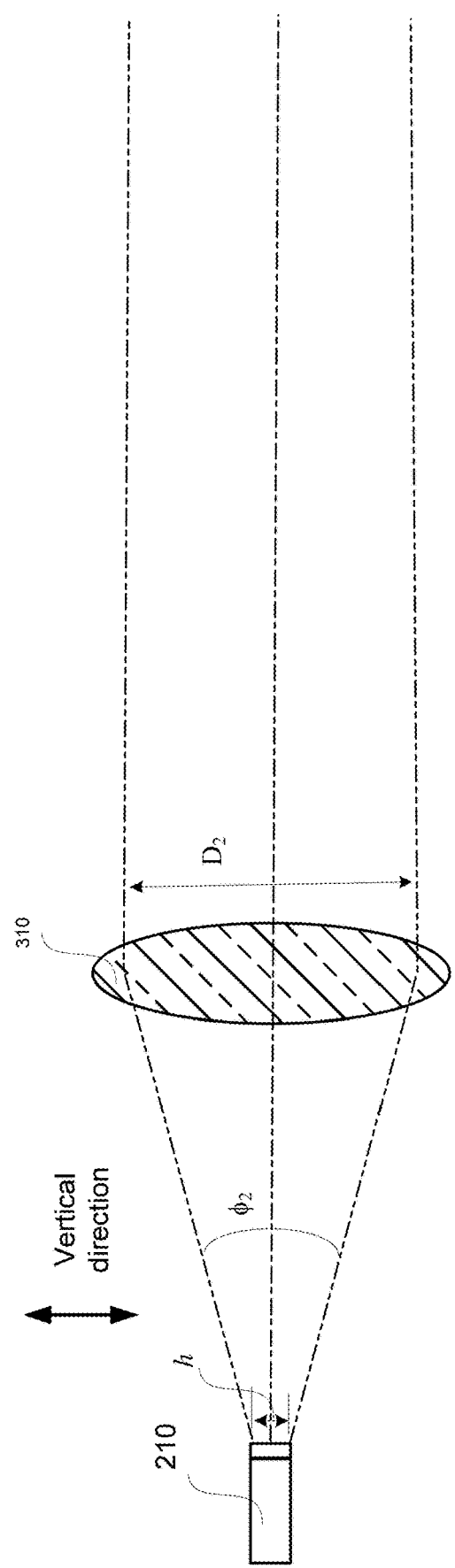

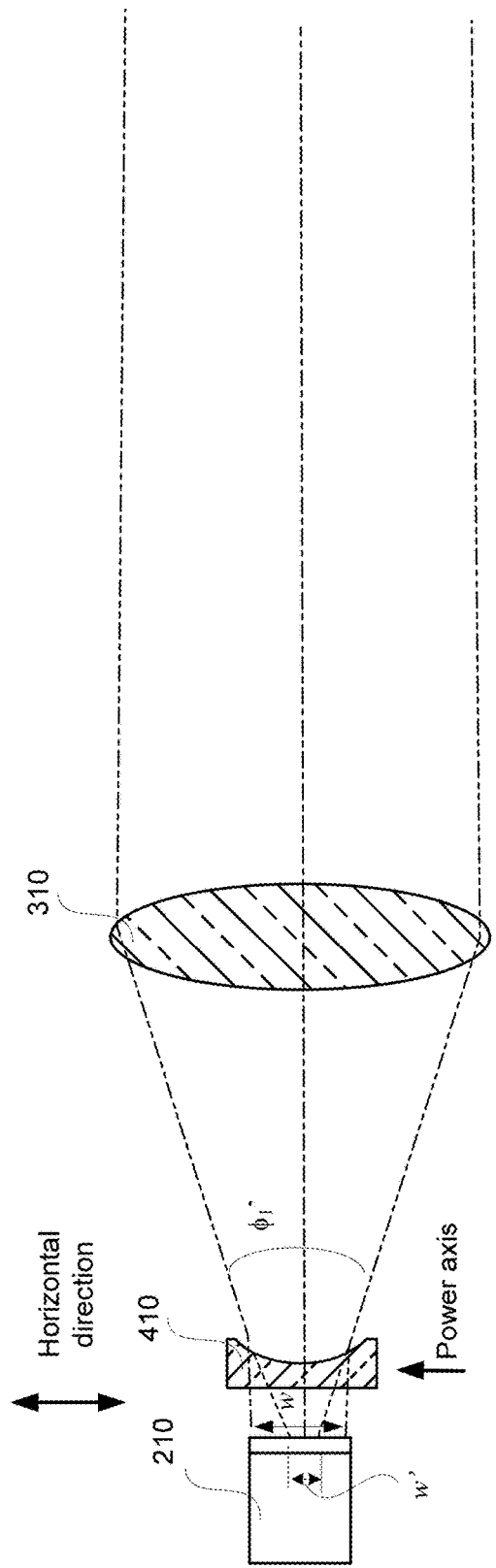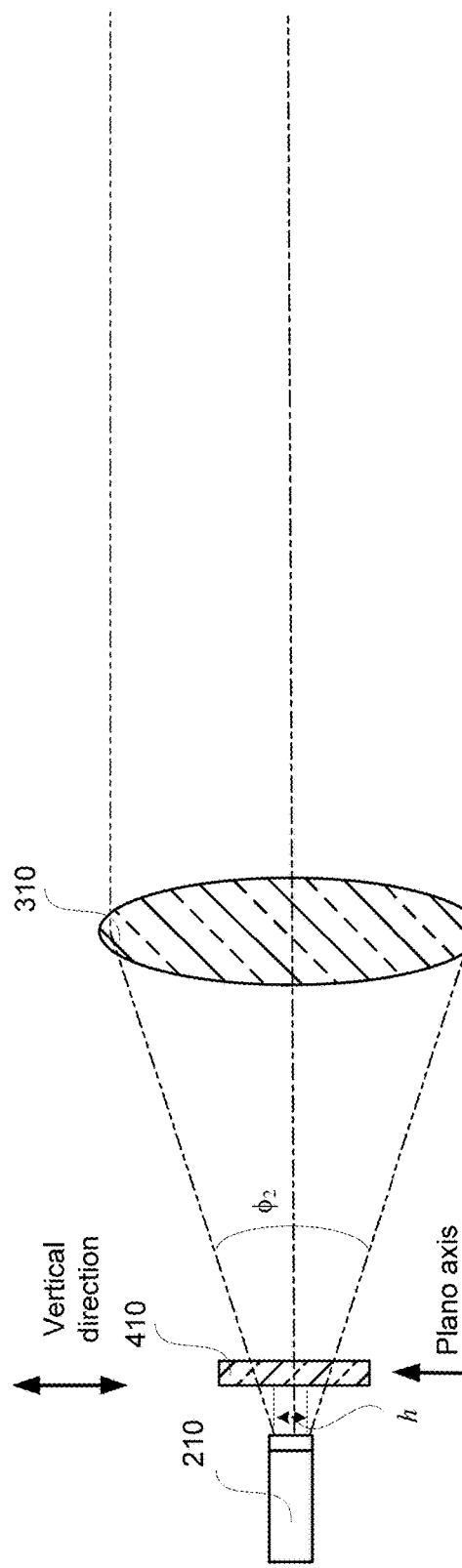
FIG. 4A
FIG. 4B

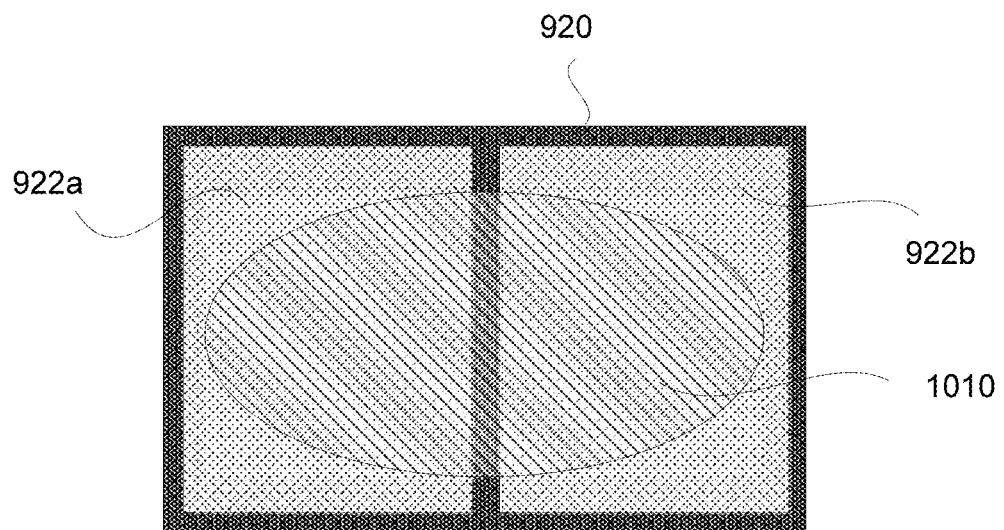
FIG. 10A
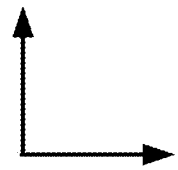
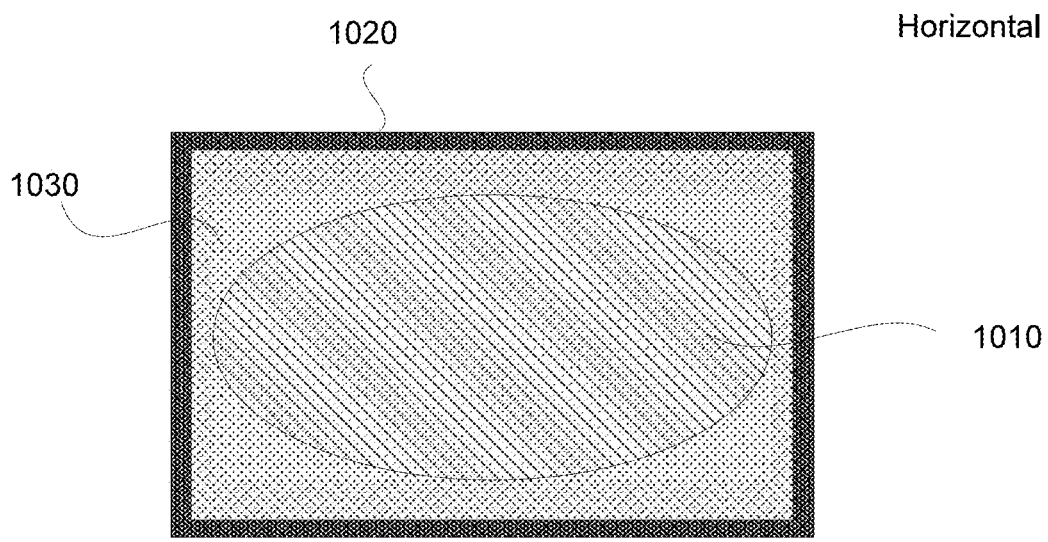
FIG. 10B

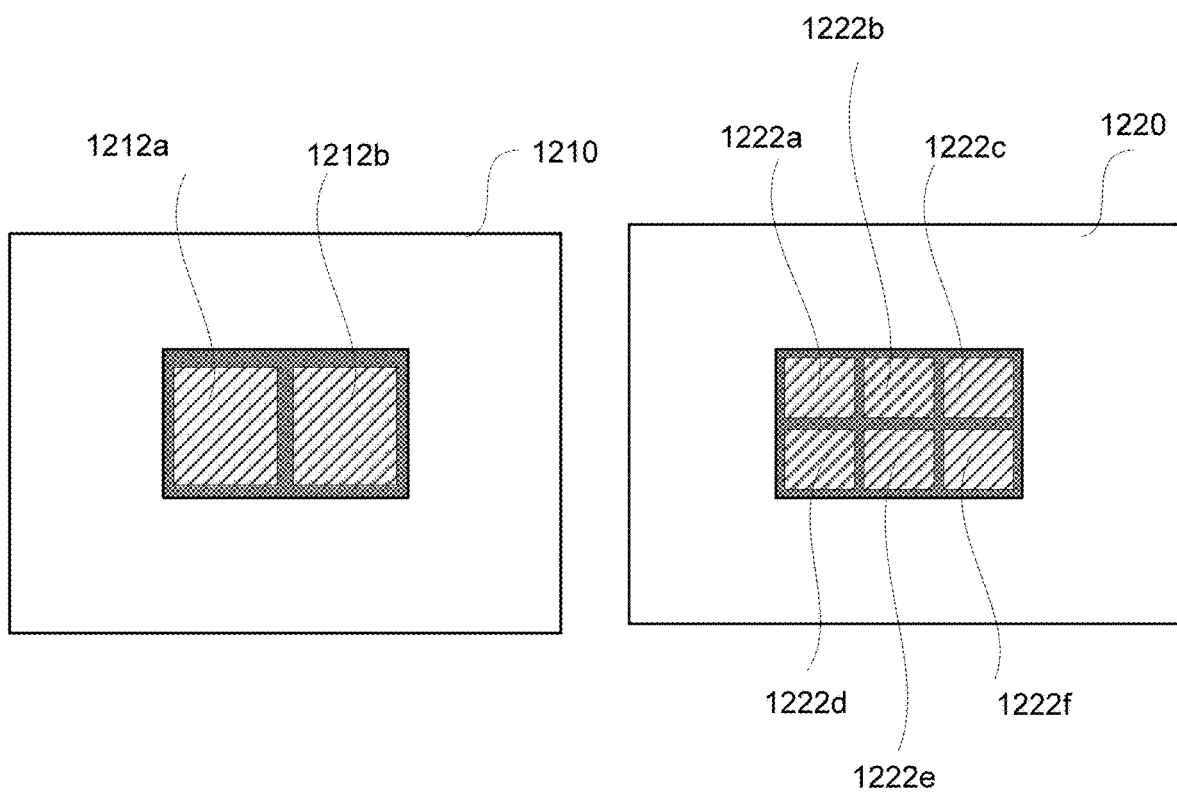
*FIG. 12A*  *FIG. 12B*

DETECTOR DESIGNS FOR IMPROVED RESOLUTION IN LIDAR SYSTEMS

CROSS-REFERENCES TO RELATED APPLICATIONS

This application claims the benefit of U.S. Provisional Patent Application No. 62/593,105, filed on Nov. 30, 2017, the content of which is hereby incorporated by reference in its entirety.

The following two U.S. patent applications (including this one) are being filed concurrently, and the entire disclosure of the other application is hereby incorporated by reference into this application for all purposes:

Application Ser. No. 16/203,422, filed Nov. 28, 2018 and entitled "OPTICAL DESIGNS USING CYLINDRICAL LENSES FOR IMPROVED RESOLUTION IN LIDAR SYSTEMS", and Application Ser. No. 16/203,430, filed Nov. 28, 2018 and entitled "DETECTOR DESIGNS FOR IMPROVED RESOLUTION IN LIDAR SYSTEMS".

BACKGROUND OF THE INVENTION

Three-dimensional sensors can be applied in autonomous vehicles, drones, robotics, security applications, and the like. Scanning lidar sensors may achieve good angular resolutions appropriate for such applications at an affordable cost. However, lidar systems and methods with even better resolutions are needed.

SUMMARY OF THE INVENTION

According to some embodiments, a lidar system includes a laser source configured to emit a laser beam carrying an electromagnetic signal, and an emission lens configured to collimate and direct the laser beam towards one or more objects within a field of view of the laser beam. The one or more objects may reflect the laser beam to generate a return laser beam. The lidar system further includes a receiving lens configured to receive and focus the return laser beam to a return beam spot at a focal plane of the receiving lens, and a detector. The detector includes a plurality of photo sensors arranged as an array at the focal plane of the receiving lens. Each respective photo sensor has a respective sensing area and is configured to receive and detect a respective portion of the return laser beam corresponding to a respective section of the field of view of the laser beam. The lidar system further includes a processor coupled to the laser source and the detector. The processor is configured to determine a respective time of flight for each respective portion of the return laser beam detected at the respective photo sensor of the detector, and construct a three-dimensional image of the one or more objects based on the respective time of flight for each respective portion of the return laser beam.

According to some embodiments, a method of three-dimensional imaging includes emitting, using a laser source, a laser pulse, and collimating and directing, using an emission lens, the laser pulse towards one or more objects within a field of view of the laser pulse. The one or more objects may reflect the laser pulse to generate a return laser pulse. The method further includes receiving and focusing, using a receiving lens, the return laser pulse to a return beam spot at a focal plane of the receiving lens. The method further includes detecting, using a detector that includes a plurality of photo sensors arranged as an array at the focal plane of the receiving lens, a respective portion of the return laser pulse received at each respective photo sensor. The respective portion of the return laser pulse corresponds to a respective section of the field of view of the laser pulse. The method further includes, using a processor coupled to the laser source and the detector, determining a time of flight for each respective portion of the return laser pulse, and constructing a three-dimensional image of the one or more objects based on the time of flight for each respective portion of the return laser pulse.

According to some embodiments, a lidar system includes a laser source configured to emit a laser beam carrying an electromagnetic signal, a lens configured to collimate and direct the laser beam towards one or more objects within a field of view of the laser beam. The one or more objects may reflect the laser beam to generate a return laser beam. The lens is further configured to receive and focus the return laser beam to a return beam spot at a focal plane of the lens. The lidar system further includes a detector. The detector includes a plurality of photo sensors arranged as an array at the focal plane of the lens. Each respective photo sensor has a respective sensing area and is configured to receive and detect a respective portion of the return laser beam corresponding to a respective section of the field of view of the laser beam. The lidar system further includes a processor coupled to the laser source and the detector. The processor is configured to determine a respective time of flight for each respective portion of the return laser beam detected at the respective photo sensor of the detector, and construct a three-dimensional image of the one or more objects based on the respective time of flight for each respective portion of the return laser beam.

BRIEF DESCRIPTION OF THE DRAWINGS

FIGS. 3A and 3B illustrate schematically an optical system for collimating a laser beam in a lidar system.

FIGS. 4A-4B illustrate schematically an optical system for collimating a laser beam in a lidar system according to some embodiments of the present invention.

FIG. 10A illustrates a detector configuration according to some embodiments of the present invention.

FIG. 10B illustrates a detector that includes a single photo sensor.

FIG. 12A shows a schematic plan view of a detector according to some embodiments of the present invention.

FIG. 12B shows a schematic plan view of a detector according to some embodiments of the present invention.

DETAILED DESCRIPTION OF THE SPECIFIC EMBODIMENTS

The present invention relates generally to lidar systems and methods for three-dimensional imaging. More specifically, the present invention relates to optical and detector designs and methods for improved resolutions in lidar systems. Merely by way of example, embodiments of the present invention provide an optical system for projecting a laser beam emitted by a laser source that has an asymmetric emission area and asymmetric divergence angles. The optical system may include a cylindrical lens with a negative power (e.g., a plano-concave cylindrical lens) placed in front of the laser source. The cylindrical lens may be configured to transform the emission area of the laser source into a virtual emission area that is substantially symmetric and smaller than the physical emission area. In combination with a rotationally symmetric projecting lens (e.g., a spherical lens), a symmetric far-field beam spot (or return beam spot) may be achieved that is smaller than would be achieved without the cylindrical lens. Since the resolution of a lidar system may depend on the far-field beam spot size, such an optical system may improve the resolution of the lidar system. Embodiments of the present invention also provide a detector that includes an array of photo sensors. Each photo sensor in the array may be configured to receive and detect a portion of a return laser beam. A lidar system with such a detector may afford enhanced resolutions as compared to a detector with a single photo sensor.

Figure 1:
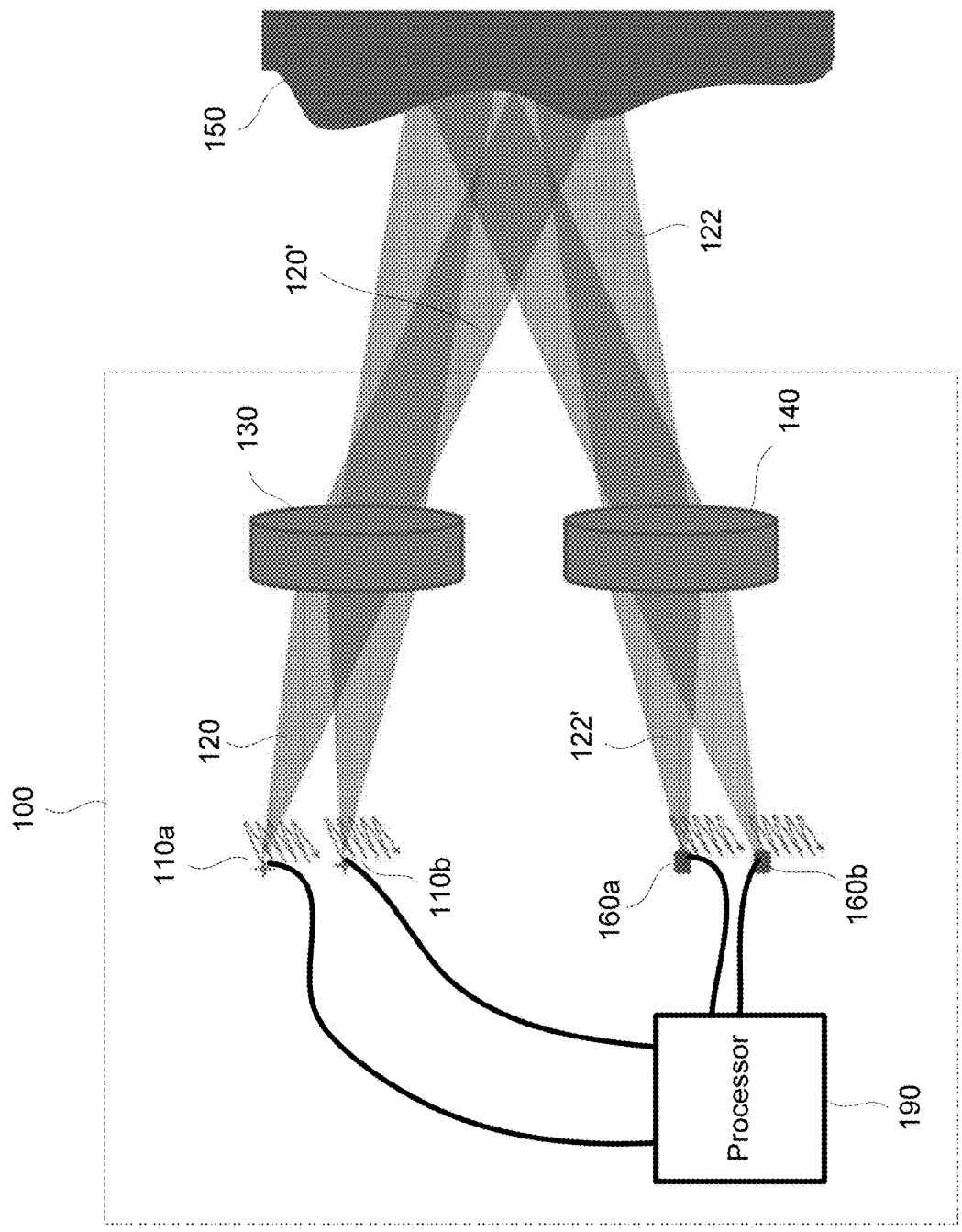
FIG. 1 illustrates schematically a lidar sensor for three-dimensional imaging according to some embodiments of the present invention.

FIG. 1 illustrates schematically a lidar sensor 100 for three-dimensional imaging according to some embodiments of the present invention. The lidar sensor 100 includes an emitting lens 130 and a receiving lens 140. The lidar sensor 100 includes a laser source 110a disposed substantially in a back focal plane of the emitting lens 130. The laser source 110a is operative to emit a laser pulse 120 from a respective emission location in the back focal plane of the emitting lens 130. The emitting lens 130 is configured to collimate and direct the laser pulse 120 toward an object 150 located in front of the lidar sensor 100. For a given emission location of the laser source 110a, the collimated laser pulse 120' is directed at a corresponding angle toward the object 150.

The laser pulse 120 may be reflected off of the object 150, thereby generating a return laser pulse 122 directed toward the receiving lens 140. The receiving lens 140 is configured to focus the return laser pulse 122 onto a corresponding detection location in the focal plane of the receiving lens 140. The lidar sensor 100 further includes a detector 160a disposed substantially at the focal plane of the receiving lens 140. The detector 160a is configured to receive and detect the return laser pulse 122 at the corresponding detection location. The corresponding detection location of the detector 160a is conjugate with the respective emission location of the laser source 110a.

The laser pulse 120 may be of a short duration, for example, 100 ns pulse width. The lidar sensor 100 further includes a processor 190 coupled to the laser source 110a and the detector 160a. The processor 190 is configured to determine a time of flight (TOF) of the return laser pulse 122. Since the return laser pulse 122 travels at the speed of light, a distance between the lidar sensor 100 and the object 150 may be determined based on the determined time of flight.

According to some embodiments, the emission lens 130 and the receiving lens 140 may be fixed. The laser source 110a may be raster scanned to a plurality of emission locations in the back focal plane of the emitting lens 130, and is configured to emit a plurality of laser pulses at the plurality of emission locations. Each laser pulse emitted at a respective emission location is collimated by the emitting lens 130 and directed at a respective angle toward the object 150, and incidents at a corresponding point on the surface of the object 150. Thus, as the laser source 110a is raster scanned within a certain area in the back focal plane of the emitting lens 130, a corresponding object area on the object 150 is scanned. The detector 160a is raster scanned to a plurality of corresponding detection locations in the focal plane of the receiving lens 140. The scanning of the detector 160a is performed synchronously with the scanning of the laser source 110a, so that the detector 160a and the laser source 110a are always conjugate with each other at any given time.

By determining the time of flight for each laser pulse emitted at a respective emission location, the distance from the lidar sensor 100 to each corresponding point on the surface of the object 150 may be determined. In some embodiments, the processor 190 is coupled with a position encoder that detects the position of the laser source 110a at each emission location. Based on the emission location, the angle of the collimated laser pulse 120' may be determined. The X-Y coordinate of the corresponding point on the surface of the object 150 may be determined based on the angle and the distance to the lidar sensor 100. Thus, a three-dimensional image of the object 150 may be constructed based on the measured distances from the lidar sensor 100 to various points on the surface of the object 150. In some embodiments, the three-dimensional image may be represented as a point cloud, i.e., a set of X, Y, and Z coordinates of the points on the surface of the object 150.

In alternative embodiments, the laser source 110a and the detector 160a may be fixed. The emission lens 130 may be scanned relative to the laser source 110a, and the receiving lens 140 may be scanned relative to the detector 160a synchronously with the scanning of the emission lens 130. In some further embodiments, the laser source 110a and the detector 160a may be scanned in at least a first direction, while the emission lens 130 and the receiving lens 140 are scanned in at least a second direction. For example, the laser source 110a and the detector 160a may be scanned in the horizontal direction, while the emission lens 130 and the receiving lens 140 are scanned in the vertical direction. In some embodiments, the laser source 110a and the detector 160a are scanned in two directions, while the emission lens 130 and the receiving lens 140 are also scanned in two directions. In some embodiments, the laser source 110a and the detector 160a may be scanned in two directions in a Lissajous pattern. The emission lens 130 and the receiving lens 140 may also be scanned in two directions in a Lissajous pattern.

In some embodiments, the laser source 110a may be configured to emit a frequency-modulated continuous-wave (FMCW) laser beam, and the processor 190 may be configured to determine the distance between the object 150 and the lidar sensor 100 by demodulating a return laser beam.

In some embodiments, the emission lens 130 and the receiving lens 140 may comprise the same lens; that is, a single lens may be configured to collimate and direct the laser pulse 120 emitted by the laser source 110a toward the object 150, as well as to focus the return laser pulse 122 onto the detector 160a.

In some embodiments, the intensity of the return laser pulse is measured and used to adjust the power of subsequent laser pulses from the same emission point, in order to prevent saturation of the detector, improve eye-safety, or reduce overall power consumption. The power of the laser pulse may be varied by varying the duration of the laser pulse, the voltage or current applied to the laser, or the charge stored in a capacitor used to power the laser. In the latter case, the charge stored in the capacitor may be varied by varying the charging time, charging voltage, or charging current to the capacitor. In some embodiments, the intensity may also be used to add another dimension to the image. For example, the image may contain X, Y, and Z coordinates, as well as reflectivity (or brightness).

The angular field of view (AFOV) of the lidar sensor 100 may be estimated based on the scanning range of the laser source 110a and the focal length of the emitting lens 130 as, $$AFOV = 2 \tan^{-1}\left(\frac{h}{2f}\right),$$

where h is scan range of the laser source 110a along certain direction, and f is the focal length of the emitting lens 130. For a given scan range h, shorter focal lengths would produce wider AFOVs. For a given focal length f, larger scan ranges would produce wider AFOVs.

In some embodiments, the lidar sensor 100 may include multiple laser sources disposed as an array at the back focal plane of the emitting lens 130, so that a larger total AFOV may be achieved while keeping the scan range of each individual laser source relatively small. Accordingly, the lidar sensor 100 may include multiple detectors disposed as an array at the focal plane of the receiving lens 140, each detector being conjugate with a respective laser source. For example, the lidar sensor 100 may include a second laser source 110b and a second detector 160b, as illustrated in FIG. 1. In other embodiments, the lidar sensor 100 may include four laser sources and four detectors, or eight laser sources and eight detectors. In one embodiment, the lidar sensor 100 may include 8 laser sources arranged as a 4×2 array and 8 detectors arranged as a 4×2 array, so that the lidar sensor 100 may have a wider AFOV in the horizontal direction than its AFOV in the vertical direction. According to various embodiments, the total AFOV of the lidar sensor 100 may range from about 5 degrees to about 15 degrees, or from about 15 degrees to about 45 degrees, or from about 45 degrees to about 90 degrees, depending on the focal length of the emitting lens, the scan range of each laser source, and the number of laser sources.

The laser source 110a may be configured to emit laser pulses in the ultraviolet, visible, or near infrared wavelength ranges. The energy of each laser pulse may be in the order of microjoules, which is normally considered to be eye-safe for repetition rates in the KHz range. For laser sources operating in wavelengths greater than about 1500 nm, the energy levels could be higher as the eye does not focus at those wavelengths. The detector 160a may comprise a silicon avalanche photo sensor, a photomultiplier, a PIN diode, or other semiconductor sensors.

Figure 2:
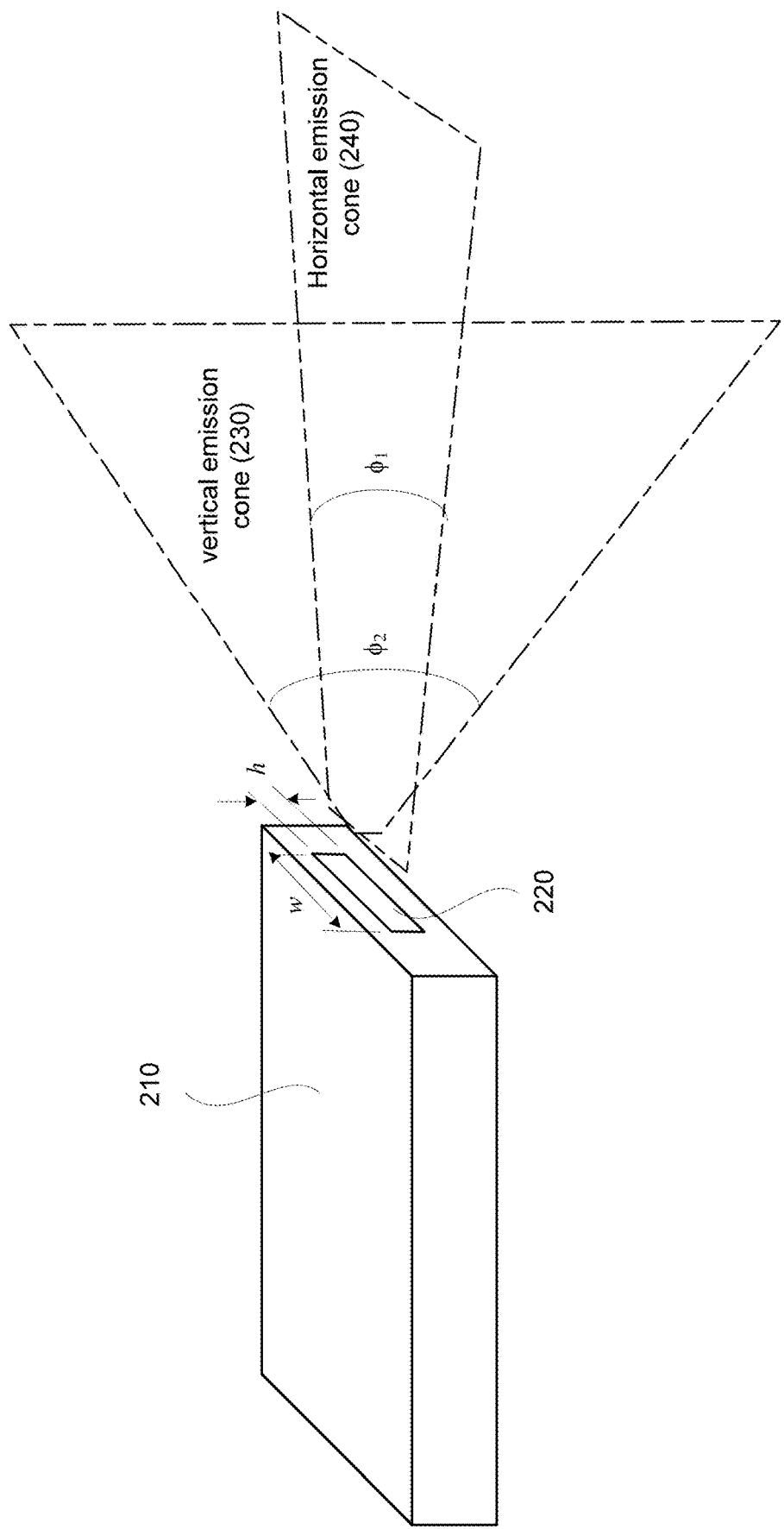
FIG. 2 illustrates schematically a laser source that has an elongated emission area and different divergence angles in the horizontal and vertical directions.

Some laser sources, for example solid state lasers, may have an asymmetric emission area and an asymmetric beam profile in the near-field as well as in the far-field. FIG. 2 illustrates schematically a laser source 210, for example, a semiconductor laser source, that has an elongated emission area 220. The emission area 220 may have a height h in the vertical direction, and a width w in the horizontal direction that is greater than the height h. For example, for a solid state laser used in a lidar system, the height h may be about 10 μM, and the width w may be about 200 μm. Although the emission area 220 is illustrated as having a rectangular shape in FIG. 2, the emission area 220 may have a rectangular shape with rounded corners or an elliptical shape.

The laser beam emitted by such laser sources may also have different divergence angles in the horizontal and vertical directions. As illustrated in FIG. 2, the horizontal emission fan 240 (e.g., in the tangential plane) may subtend an angle $\phi_1$ (which may be referred herein as the angular divergence), and the vertical emission fan 230 (e.g., in the sagittal plane) may subtend an angle $\phi_2$ that is greater than $\phi_1$. For example, the angular divergence $\phi_1$ of the horizontal emission fan 240 may be about 10 degrees, and the angular divergence $\phi_2$ of the vertical emission fan 230 may be about 25 degrees. In other words, the light beam has a larger source dimension and smaller divergence in the horizontal direction, and a smaller source dimension and larger divergence in the vertical direction. Because the laser beam diverges faster in the vertical direction, the vertical direction may be referred to as the fast axis, and the horizontal direction may be referred to as the slow axis.

The asymmetric emission area and asymmetric angular divergence of a laser beam as described above may make it more challenging to collimate the laser beam in both the horizontal and vertical directions using rotationally symmetric lenses, such as spherical lenses or aspherical lenses. FIGS. 3A and 3B illustrate schematically an optical system for collimating a laser beam in a lidar system. The optical system includes a spherical lens 310 positioned in front of the laser source 210 (the spherical lens 310 can be, e.g., the emission lens 130 illustrated in FIG. 1). FIG. 3A illustrates the light paths for the horizontal emission fan; and FIG. 3B illustrates the light paths for the vertical emission fan.

As illustrated in FIG. 3B, if the emission surface of the laser source 210 is positioned at approximately the back focal plane of the lens 310, light rays in the vertical emission fan may be substantially collimated by the lens 310; that is, the light rays post the lens 310 along the optical path may be nearly parallel to each other. On the other hand, as illustrated in FIG. 3A, light rays in the horizontal emission fan may be converging post the lens 310 along the optical path, as the power of the lens 310 may be too large for collimating the horizontal emission fan, which has a smaller divergence angle $\phi_1$ than the divergence angle $\phi_2$ of the vertical emission fan. In other words, to collimate the horizontal emission fan, a lens with a smaller power (hence a longer focal length) than that of the lens 310 may be required.

Because of the asymmetric emission area and the asymmetric divergence angles of a laser source as described above, a return beam spot imaged onto a detector in a lidar system may also be asymmetric. For example, in the lidar system 100 illustrated in FIG. 1, with the spherical emission lens 130, the far-field beam spot at the object 150 may be asymmetric; consequently, the return beam spot imaged by the spherical receiving lens 140 onto the detector 160a may also be asymmetric. Since the angular resolution of a lidar system may depend on the return beam spot size, an asymmetric return beam spot can limit the resolution of the lidar system.

I. Optical Designs for Improved Resolution

According to some embodiments of the present invention, a cylindrical lens with a negative power may be used in combination with a rotationally symmetric emission lens to achieve a relatively uniform angular resolution in the horizontal and vertical directions. FIGS. 4A-4B illustrate schematically an optical system for projecting a laser beam in a lidar system according to some embodiments. The optical system includes a plano-concave cylindrical lens 410 positioned in front of the laser source 210. The power axis of the of cylindrical lens 410 may be substantially along the horizontal direction. That is, the cylindrical lens 410 may have a non-zero power in the horizontal direction as illustrated in FIG. 4A, and has almost no power in the vertical direction as illustrated in FIG. 4B.

As illustrated in FIG. 4A, the cylindrical lens 410 may be configured to expand the angular divergence of the horizontal emission fan from $\phi_1$ into $\phi_1'$. The expanded horizontal emission fan may appear to be emitted from a virtual emission area that has a virtual width w' that is less than the actual width w. In some embodiments, the cylindrical lens 410 may be configured such that the virtual width w' is substantially equal to the height h of the vertical emission fan.

As illustrated in FIG. 4B, because the cylindrical lens 410 has no optical power in the vertical direction, the angular divergence $\phi_2$ of the vertical emission fan is not affected by the cylindrical lens 410. In some embodiments, the expanded angular divergence $\phi_1'$ of the horizontal emission fan may be substantially equal to the angular divergence $\phi_2$ of the vertical emission fan. Thus, both the horizontal emission fan and the vertical emission fan may be collimated by the lens 310, as illustrated in FIGS. 4A-4B.

Although FIGS. 4A-4B shows an exemplary embodiment in which the cylindrical lens 410 has a plano-concave shape, other types of cylindrical lens (e.g., double-concave cylindrical lens or meniscus cylindrical lens) may be used according to some embodiments.

Figure 5C:
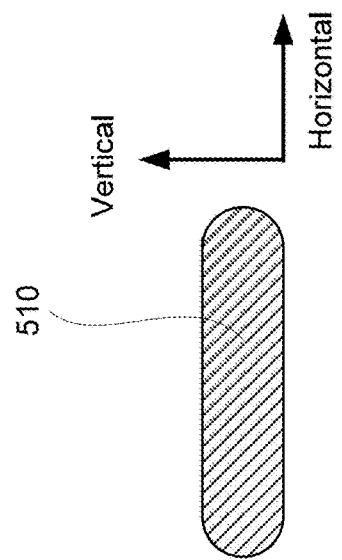
FIGS. 5A-5D illustrate schematically an effect of a cylindrical lens on the far-field beam spot shape according to some embodiments of the present invention.
Figure 5D:
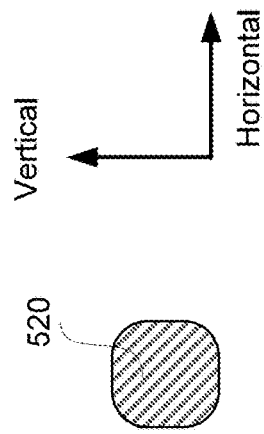
Figure 5A:
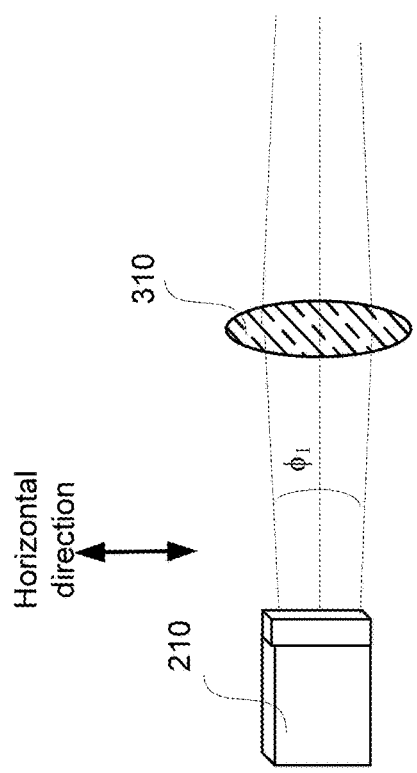
Figure 5B:
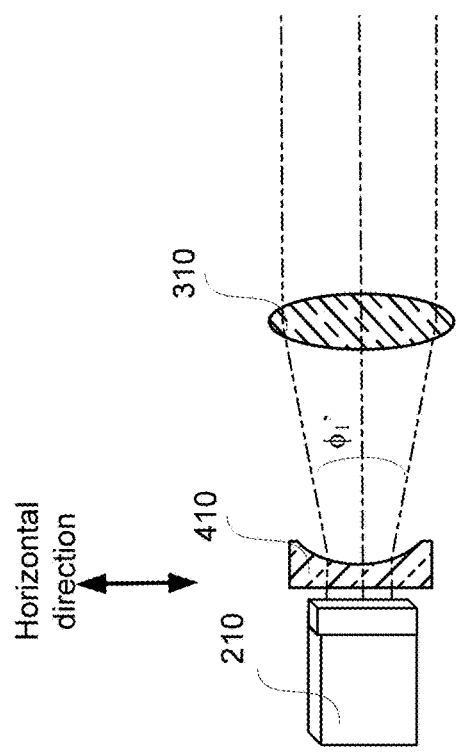

FIGS. 5A-5D illustrate schematically the effect that the cylindrical lens 410 may have on the far-field beam spot shape. As illustrated in FIGS. 5A and 5C, without the cylindrical lens 410, the far-field beam spot 510 may be elongated in the horizontal direction because of the asymmetric emission area and the asymmetric divergence angles. As illustrated in FIG. 5B, by inserting the cylindrical lens 410 between the laser source 210 and the emission lens 310, light rays in the horizontal emission fan, as well as light rays in the vertical emission fan (not shown), may be collimated. As a result, the far-field beam spot 520 may be substantially symmetric in the horizontal and vertical directions, as illustrated in FIG. 5D.

Traditionally, a cylindrical lens with a positive power (e.g., a plano-convex cylindrical lens) is placed between a laser and a spherical collimating lens to circularize a laser beam. For example, a cylindrical lens with a positive power may be oriented such that the power axis is aligned with the vertical direction so as to reduce the divergence angle of the vertical emission fan. Consequently, a collimating lens with an increased focal length, as compared to the configuration illustrated in FIGS. 4A and 4B, may be required to collimate the laser beam. A longer focal length of the collimating lens may lead to a larger physical size of the lidar system, and thus may increase the manufacturing cost of the lidar system.

Using a cylindrical lens with a negative power may be particularly advantageous in a scanning lidar system. For example, in the scanning lidar system illustrated in FIG. 1, the emission lens 130 and the receiving lens 140 are fixed, while the laser sources 110a and 110b, and the detectors 160a and 160b are scanned in the focal planes of the emission lens 130 and the receiving lens 140, respectively. The scanning distance may be proportional to the focal length of the emission lens 130 for achieving a given angular field of view (FOV). Thus, by using an emission lens 130 with a shorter focal length, the scanning distance can be shortened while maintaining the same FOV.

Figure 6A:
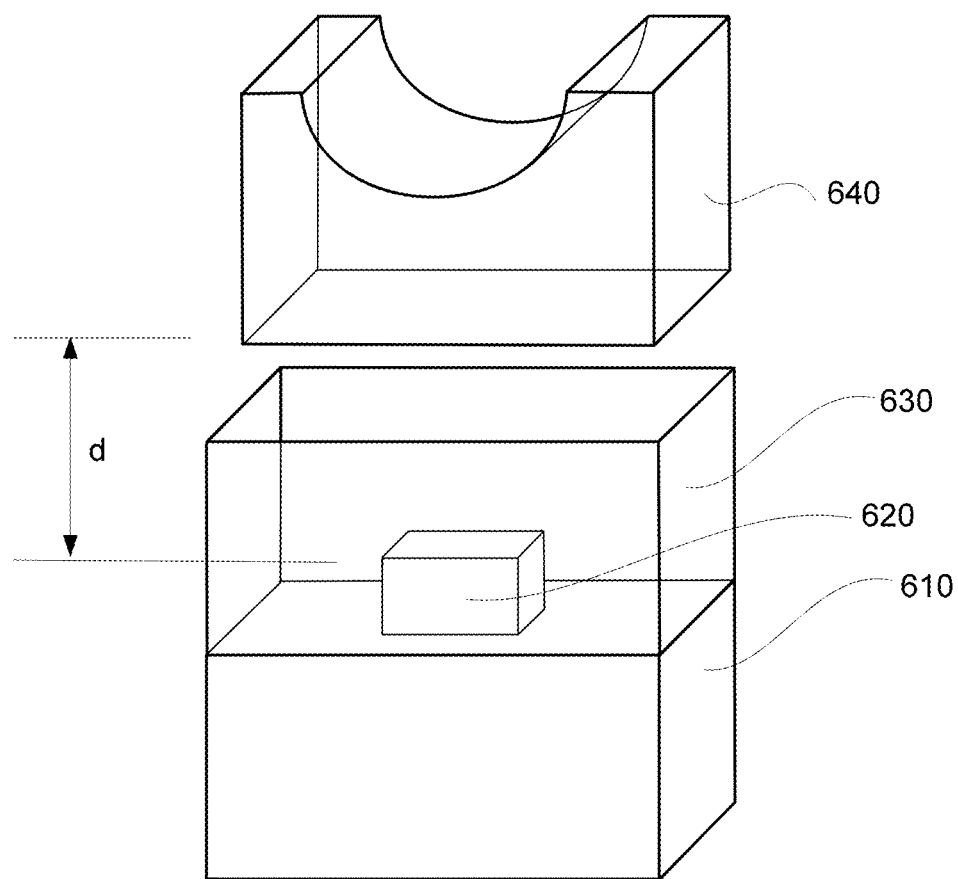
FIG. 6A illustrates schematically an exemplary configuration of a laser source and a cylindrical lens that may be used in a lidar system according to some embodiments of the present invention.

FIG. 6A illustrates schematically an exemplary configuration of a laser source 610 and a cylindrical lens 640 that may be used in a lidar system. The laser source 610 may include a laser die 620 encapsulated by a transparent cover 630. According to some embodiments, the focal length of the cylindrical lens 640 may range from about −0.2 mm to about −5 mm. For a cylindrical lens 640 with a plano-concave shape, as illustrated in FIG. 6A, the radius of curvature of the concave surface may range from about −0.1 mm to about −2 mm (e.g., about −0.5 mm). The cylindrical lens 640 may be placed at a distance d from the emission surface of the laser die 620 ranging from about 0.2 mm to about 5 mm (e.g., about 1 mm). It may be advantageous to place the cylindrical lens 640 in close proximity to the emission surface of the laser die 620, so as to minimize certain undesirable optical effects of the cylindrical lens (e.g., slightly different best focus planes in the horizontal and vertical directions, which may be referred to as astigmatism). The distance d between the cylindrical lens 640 and the emission surface of the laser die 620 may be similar but not identical to the focal length of the cylindrical lens 640, and may depend on the thickness of the cylindrical lens 640 and the shape of the cylindrical lens 640 (e.g., whether the cylindrical lens 640 is a plano-concave or double-concave).

Figure 6B:
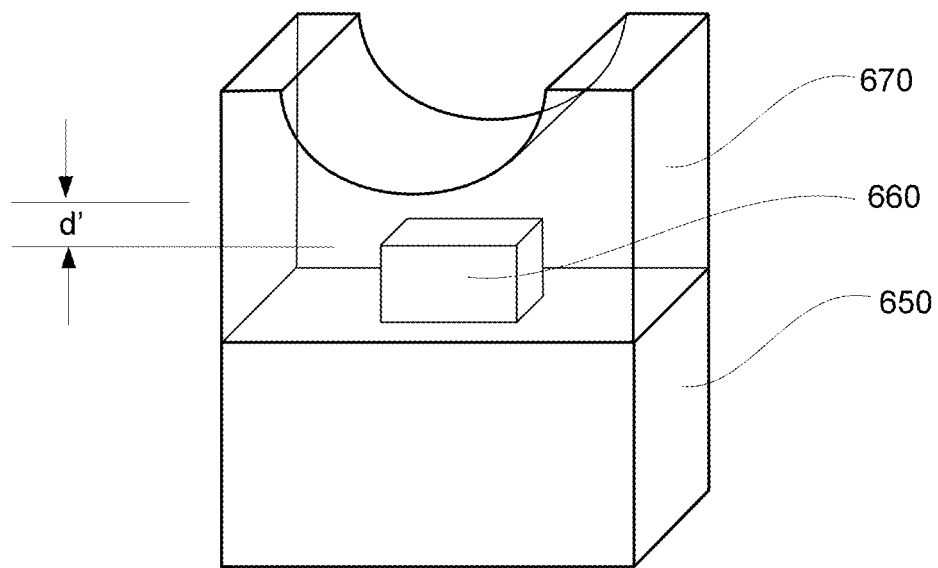
FIG. 6B illustrates schematically another exemplary configuration of a laser source and a cylindrical lens according to some embodiments of the present invention.

FIG. 6B illustrates schematically another exemplary configuration of a laser source 650 and a cylindrical lens 670 according to some embodiments. Here, the cylindrical lens 670 is molded directly into the cover encapsulating the laser die 660. In some embodiments, the focal length of the cylindrical lens 670 may range about −0.1 mm to about −2 mm. The distance d' between the apex of the concave surface and the emission surface of the laser die 660 may range from about 0.1 mm to about 2 mm. The distance d' may be similar but not identical to the focal length of the cylindrical lens 670.

Figure 7A:
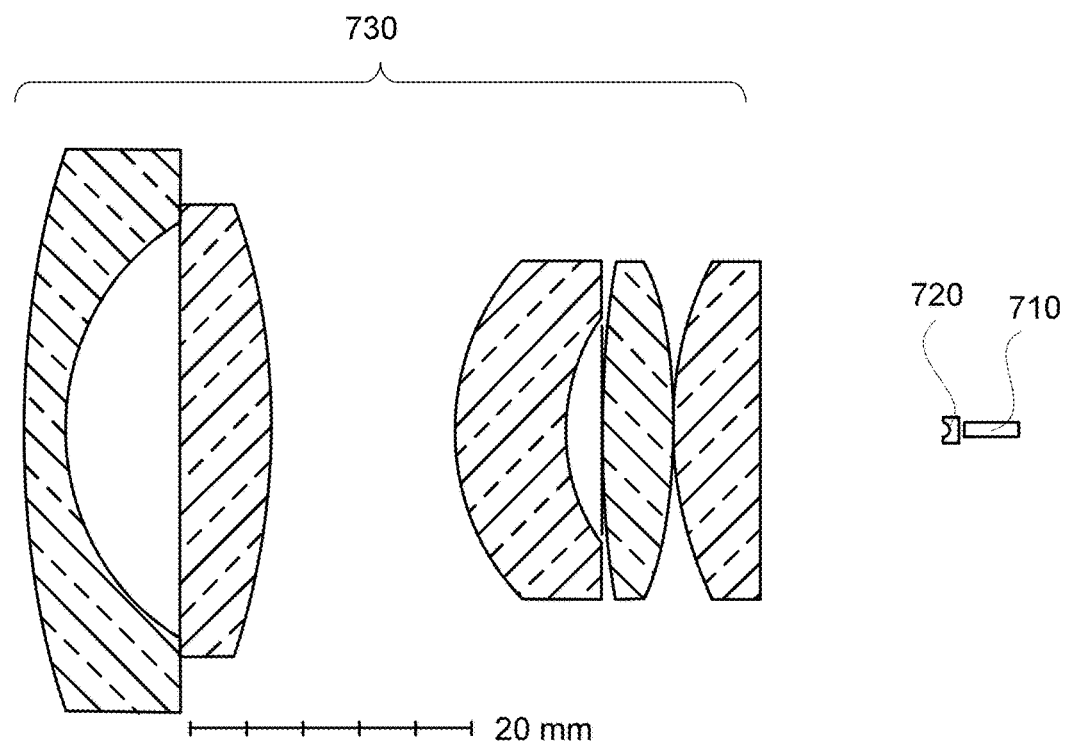
FIG. 7A illustrates a cross-sectional view of an optical system for collimating a laser beam in a lidar system according to some embodiments of the present invention.

FIG. 7A illustrates a cross-sectional view of an optical system for projecting a laser beam in a lidar system according to some embodiments. A cylindrical lens 720 is placed in front of a laser source 710 (e.g., a laser diode). A spherical emission lens 730 is positioned in front of the cylindrical lens 720. The emission lens 730 may be a compound lens that includes several lens components. In some embodiments, the emission lens 730 may have a focal length ranging from about 5 mm to about 50 mm (e.g., about 16 mm). The diameter (e.g., the aperture) of the emission lens 730 may range from about 5 mm to about 100 mm (e.g., 40 mm).

Figure 7B:
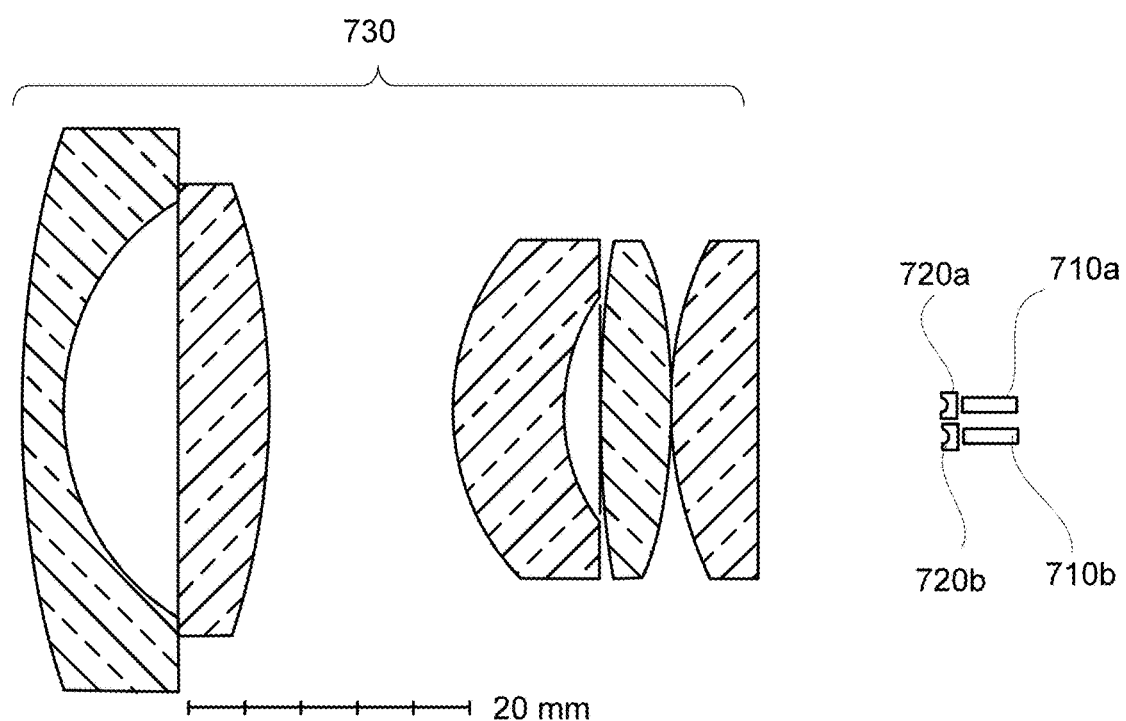
FIG. 7B illustrates a cross-sectional view of an optical system for collimating laser beams in a lidar system that includes two laser sources according to some embodiments of the present invention.

In some embodiments, a lidar system may include multiple laser sources arranged in an array that are projected by a single spherical emission lens. In such cases, each laser source may be paired with its own cylindrical lens. FIG. 7B illustrates an exemplary embodiment where a lidar system includes two laser sources 710a and 710b. A first cylindrical lens 720a is paired with the first laser source 710a, and a second cylindrical lens 720b is paired with the second laser source 710b. The two laser sources 710a and 710b share the same spherical emission lens 730.

Figure 8:
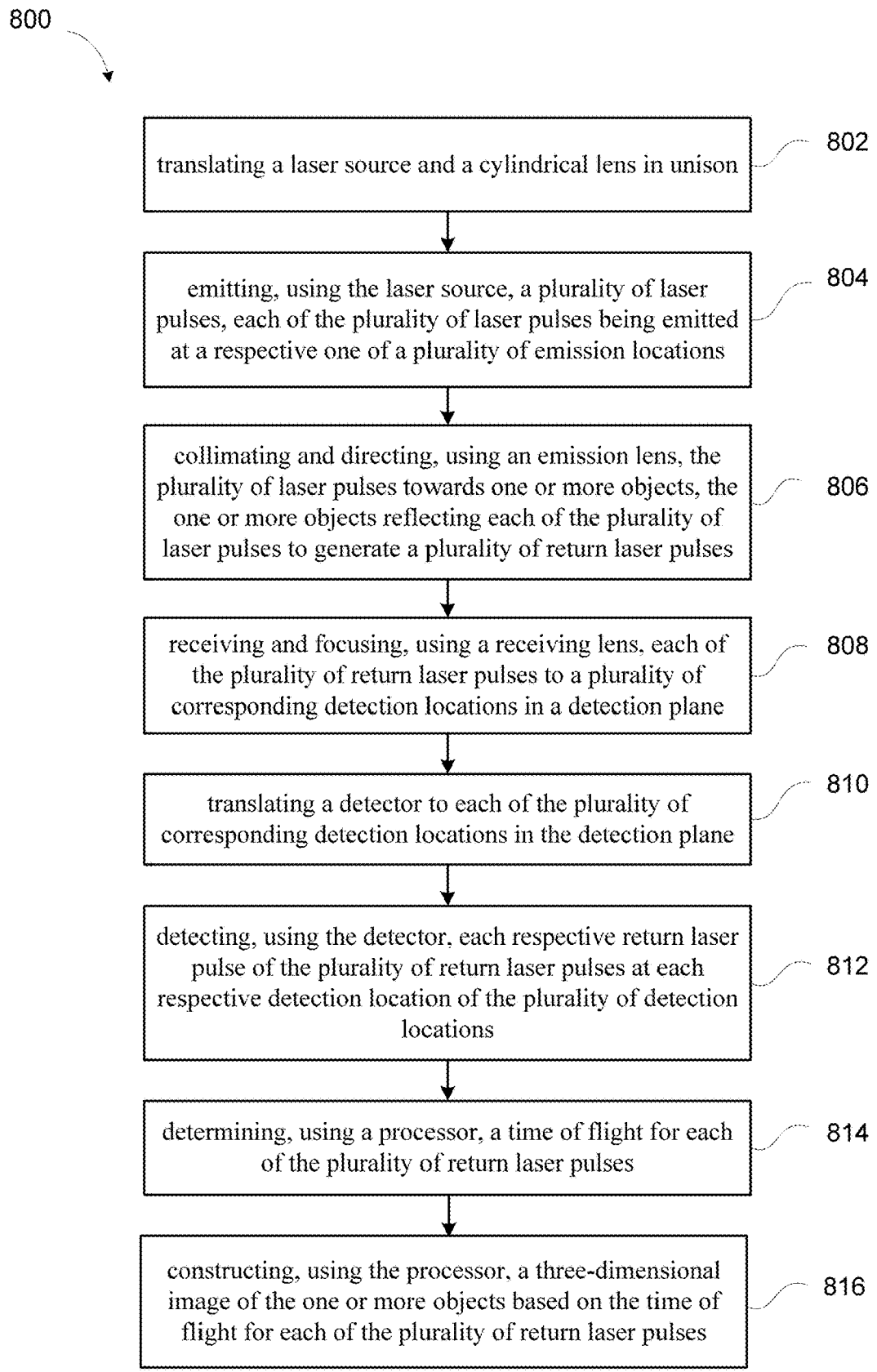
FIG. 8 shows a simplified flowchart illustrating a method of three-dimensional imaging using a lidar system according to some embodiments of the present invention.

FIG. 8 shows a simplified flowchart illustrating a method 800 of three-dimensional imaging using a lidar system according to some embodiments of the present invention.

The method 800 may include, at 802, translating a laser source and a cylindrical lens in unison. The laser source is translated to each of a plurality of emission locations in an emission plane. The laser source has an emission area with a first height and a first width greater than the first height. The cylindrical lens has a negative power and is positioned in front of the laser source. The cylindrical lens is oriented such that a power axis of the cylindrical lens is substantially in a width direction. The cylindrical lens may be configured to transform the emission area of the laser source into a virtual emission area with a virtual width and a virtual height, where the virtual width is smaller than the first width of the emission area. The cylindrical lens may be a plano-concave cylindrical lens or a double-concave cylindrical lens. In some embodiments, the cylindrical lens may be integrated with the laser source in a single package.

The method 800 may further include, at 804, emitting, using the laser source, a plurality of laser pulses. Each of the plurality of laser pulses is emitted at a respective one of the plurality of emission locations. The method 800 may further include, at 806, collimating and directing, using an emission lens, the plurality of laser pulses towards one or more objects. The one or more objects may reflect each of the plurality of laser pulses to generate a plurality of return laser pulses.

The method 800 may further include, at 808, receiving and focusing, using a receiving lens, each of the plurality of return laser pulses to a plurality of corresponding detection locations in a detection plane. Each corresponding detection location is conjugate with a respective emission location. In some embodiments, the receiving lens and the transmission lens may be the same lens; i.e., the same lens that is configured to collimate and direct the plurality of laser pulses towards the one or more objects, as well as focusing the plurality of return laser pulses.

The method 800 may further include, at 810, translating a detector to each of the plurality of corresponding detection locations in the detection plane; and at 812, detecting, using the detector, each respective return laser pulse of the plurality of return laser pulses at each respective detection location of the plurality of detection locations.

The method 800 may further include, at 814, determining, using a processor, a time of flight for each of the plurality of return laser pulses; and at 816, constructing, using the processor, a three-dimensional image of the one or more objects based on the time of flight for each of the plurality of return laser pulses.

In some embodiments, each of the laser source and the detector are translated in one dimension or in two dimensions. In some embodiments, the laser source and the detector may be scanned in two directions in a Lissajous pattern. In some embodiments, the emission lens and the receiving lens are fixed while the laser source and the detector are being translated.

In some other embodiments, the method 800 may further include translating the emission lens relative to the laser source in a plane substantially perpendicular to an optical axis of the emission lens; and translating the receiving lens relative to the detector in the plane synchronously with the translation of the emission lens. In some embodiments, each of the emission lens and the receiving lens is translated in one dimension or two dimensions. In some embodiments, the emission lens and the receiving lens may be scanned in two directions in a Lissajous pattern.

It should be appreciated that the specific steps illustrated in FIG. 8 provide a particular method of performing three-dimensional imaging using a lidar system according to some embodiments of the present invention. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

II. Detector Designs for Improved Resolution

According to some embodiments, another approach to improve the resolution of a lidar system may be implemented on the detector side. As illustrated in FIGS. 5A and 5C, without using a cylindrical lens, the far-field beam spot 510 may be elongated in the horizontal direction. As a result, an image of the far-field beam spot 510 formed by a receiving lens (e.g., the receiving lens 140 illustrated in FIG. 1) on a detector (e.g., the detector 160a or 160b illustrated in FIG. 1) may also be elongated in the horizontal direction.

Figure 9:
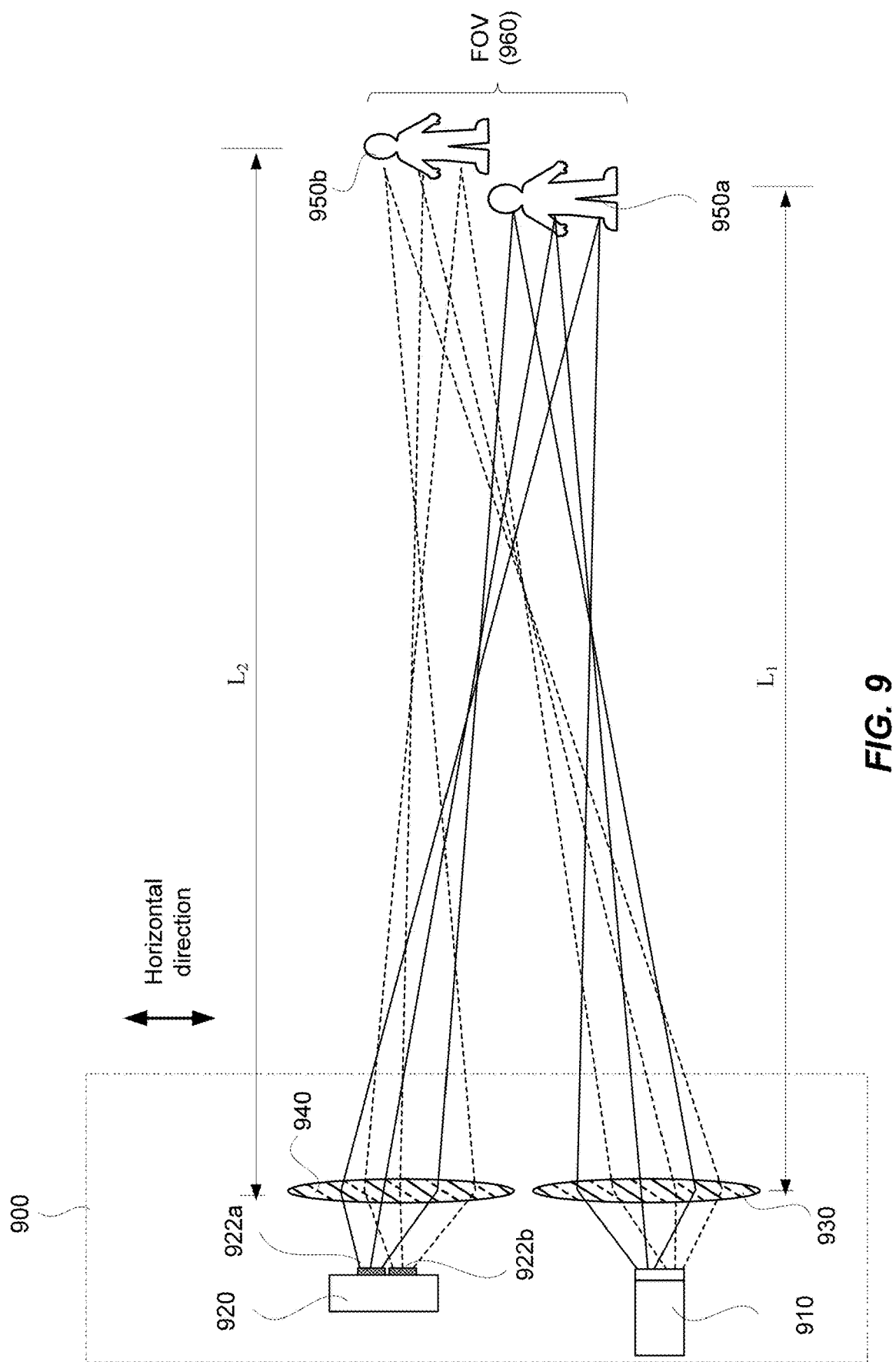
FIG. 9 illustrates schematically a lidar system according to some embodiments of the present invention.

FIG. 9 illustrates schematically a lidar system 900 according to some embodiments. Similar to the lidar system 100 illustrated in FIG. 1, the lidar system 900 may include a laser source 910, and an emission lens 930 for collimating a laser beam emitted by the laser source 910. The collimated laser beam may be reflected off of one or more objects 950a and 950b. The lidar system 900 may further include a receiving lens 940 for focusing the return laser beam, and a detector 920 positioned at a focal plane of the receiving lens 940 for detecting the focused return laser beam. As discussed above, because of the asymmetric profile of the emitted laser beam, the focused spot of the return laser beam at the detector 920 may be elongated. FIG. 10 illustrates schematically a return beam spot 1010 imaged at the focal plane of the receiving lens 940 that is elongated in the horizontal direction.

According to some embodiments, the detector 920 may include an array of photo sensors. For example, the detector 920 may include two photo sensors 922a and 922b arranged next to each other as a one-dimensional array in the horizontal direction. As illustrated in FIGS. 9 and 10, each photo sensor 922a or 922b has a sensing area that covers a portion of the return beam spot 1010. Thus, the first photo sensor 922a may detect the left half of the return laser beam, and the second photo sensor 922b may detect the right half of the return laser beam.

As an illustrative example, FIG. 9 shows that the laser beam may be projected onto two objects 950a and 950b (e.g., two people) located within the FOV 960 of the laser beam in the far-field. The laser spot size in the far-field may be approximately equal to the dimension of the emission area of the laser source times the distance from the laser source to the object, and divided by the focal length of the emission lens 930. A first portion of the return laser beam that is reflected off of the first object 950a (represented by the light rays illustrated with the solid lines) may be imaged onto the left half of the return beam spot 1010; and a second portion of the return laser beam that is reflected off of the second object 950b (represented by the light rays illustrated with the dashed lines) may be imaged onto the right half of the return beam spot 1010. As illustrated in FIGS. 9 and 10A, the first photo sensor 922a may detect the first portion of the return laser beam reflected off of the first object 950a, and the second photo sensor 922b may detect the second portion of the return laser beam reflected off of the second object 950b. Therefore, the lidar system 900 may be able to resolve the two objects 950a and 950b. It should be understood that "vertical" and "horizontal" orientations may be switched in the context of the drawings and description, or the orientation may be arbitrarily rotated, as would be apparent to one skilled in the art.

For comparison, FIG. 10B illustrates a detector 1020 that includes a single photo sensor 1030 with a sensing area that encompass the entire return beam spot 1010. In this configuration, the lidar system 900 may not be able to resolve the two objects 950a and 950b, as a single return laser pulse may be detected by the detector 1020. Thus, by having two photo sensors 922a and 922b arranged as an array in the horizontal direction as illustrated in FIGS. 9 and 10A, the resolution of the lidar system 900 in the horizontal direction may be approximately doubled as compared to a detector 1020 with a single photo sensor 1030.

Figure 11A:
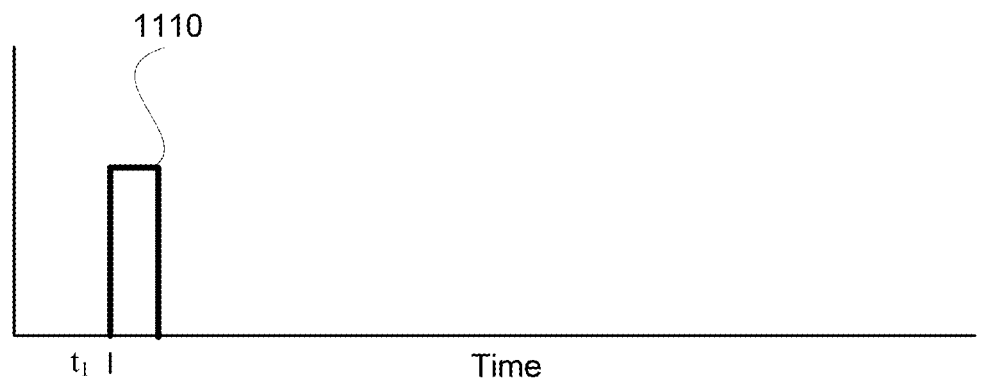
FIGS. 11A-11C illustrate schematically timing diagrams of laser pulses for the example illustrated in FIGS. 9 and 10 according to some embodiments of the present invention.
Figure 11B:
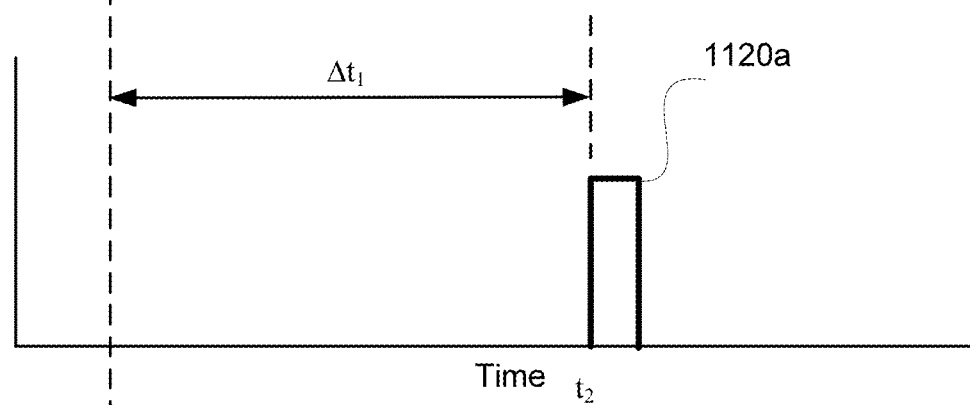
Figure 11C:
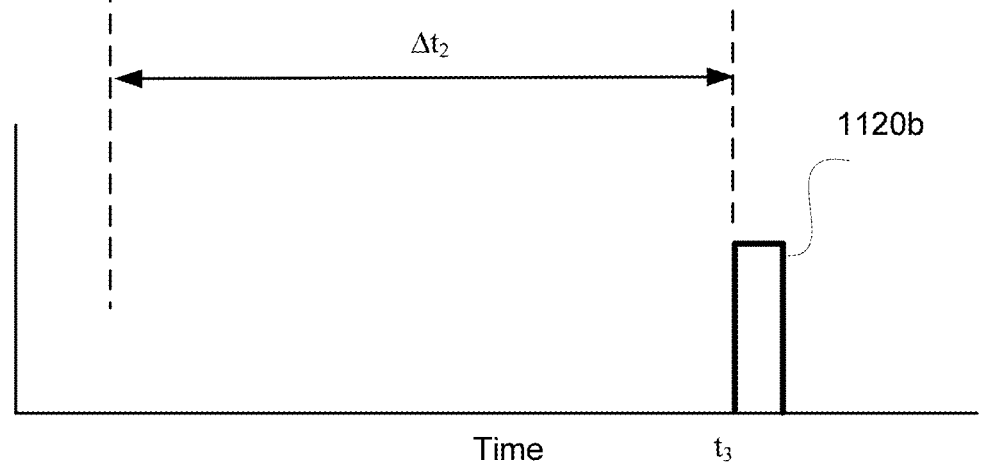

According to some embodiments, the detector 920 may have separate outputs for the individual photo sensors, so that the time of flight for each portion of the return laser pulse detected by each photo sensor may be determined independently. FIGS. 11A-11C illustrate schematically timing diagrams of laser pulses for the example illustrated in FIGS. 9 and 10. As illustrated in FIG. 11A, a laser pulse 1110 may be emitted by the laser source 910 at a first instance of time $t_1$. The laser pulse 1110 may be reflected off of the first object 950a and the second object 950b. As illustrated in FIG. 11B, a first portion of the return laser pulse reflected off of the first object 950a may be detected by the first photo sensor 922a at a second instance of time $t_2$. The time elapsed between $t_1$ and $t_2$ may be determined as $\Delta t_1$. A distance $L_1$ between the lidar system 900 and the first object 950a may be determined based on $\Delta t_1$. Similarly, as illustrated in FIG. 11C, a second portion of the return laser pulse reflected off of the second object 950b may be detected by the second photo sensor 922b at a third instance of time $t_3$. The time elapsed between $t_1$ and $t_3$ may be determined as $\Delta t_2$. A distance $L_2$ between the lidar system 900 and the second object 950b may be determined based on $\Delta t_2$. Therefore, by having two photo sensors 922a and 922b in the detector 920 with separate outputs, the lidar system 900 may be able to resolve the different distances $L_1$ and $L_2$ of the two objects 950a and 950b.

FIG. 12A shows a schematic plan view of a detector 1210 according to some embodiments. The detector 1210 may include a one-dimensional array of photo sensors, such as a 1×2 array that includes the photo sensors 1212a and 1212b. Although a 1×2 array of photo sensors is illustrated in FIG. 12A, the detector 1210 may include a 1×3 array of photo sensors, a 1×4 array of photo sensors, or the like. For example, by using a 1×3 array, an approximately three-fold improvement of the resolution in the direction of the array may be achieved.

FIG. 12B shows a schematic plan view of a detector 1220 according to some embodiments. The detector 1220 may include a two-dimensional array, such as a 2×3 array that includes photo sensors 1222a-1222f. Thus, an approximately two-fold improvement of the resolution in one direction, and an approximately three-fold improvement of the resolution in the orthogonal direction may be achieved. Although a 2×3 array of photo sensors is illustrated in FIG. 12B, the detector 1220 may include a 2×4 array of photo sensors, a 2×5 array of photo sensors, or other configurations, according to various embodiments.

In some embodiments, the array of photo sensors may be configured such that the total surface area of the array approximately matches that of the image spot of the return laser beam formed by the receiving lens 940. For example, if the image spot has a 1×2 aspect ratio, the detector may include a 1×2 array of photo sensors or a 2×4 array of photo sensors (assuming that the surface area of each photo sensor is a square). Dead space between photo sensors may be advantageously reduced or minimized to avoid loss of detection efficiency.

According to various embodiments, the photo sensors may include photodiodes, phototransistors, photoresistors, photomultiplier tubes, microchannel plate detectors, charge-coupled devices (CCDs), and the like.

According to some other embodiments, a bi-cell or a quad-cell detector may be used. In such cases, the detector includes a single detector designed to have multiple outputs corresponding to the locations where light is incident on the detector.

The array detector concept described above may be extended to lidar systems that include multiple laser sources and multiple detectors. In such cases, each laser source may be paired with its own array detector. For example, referring to FIG. 1, a first laser source 110a may be paired with a first detector 160a, and a second laser source 110b may be paired with a second detector 160b, where each of the first detector 160a and the second detector 160b includes a photo sensor array.

According to some embodiments, an array detector may be used in a lidar system in combination with a collimating optical system that includes a cylindrical lens (e.g, as discussed above with references to FIGS. 4A-4B, 6A-6B, and 7) for further resolution improvement.

Figure 13:
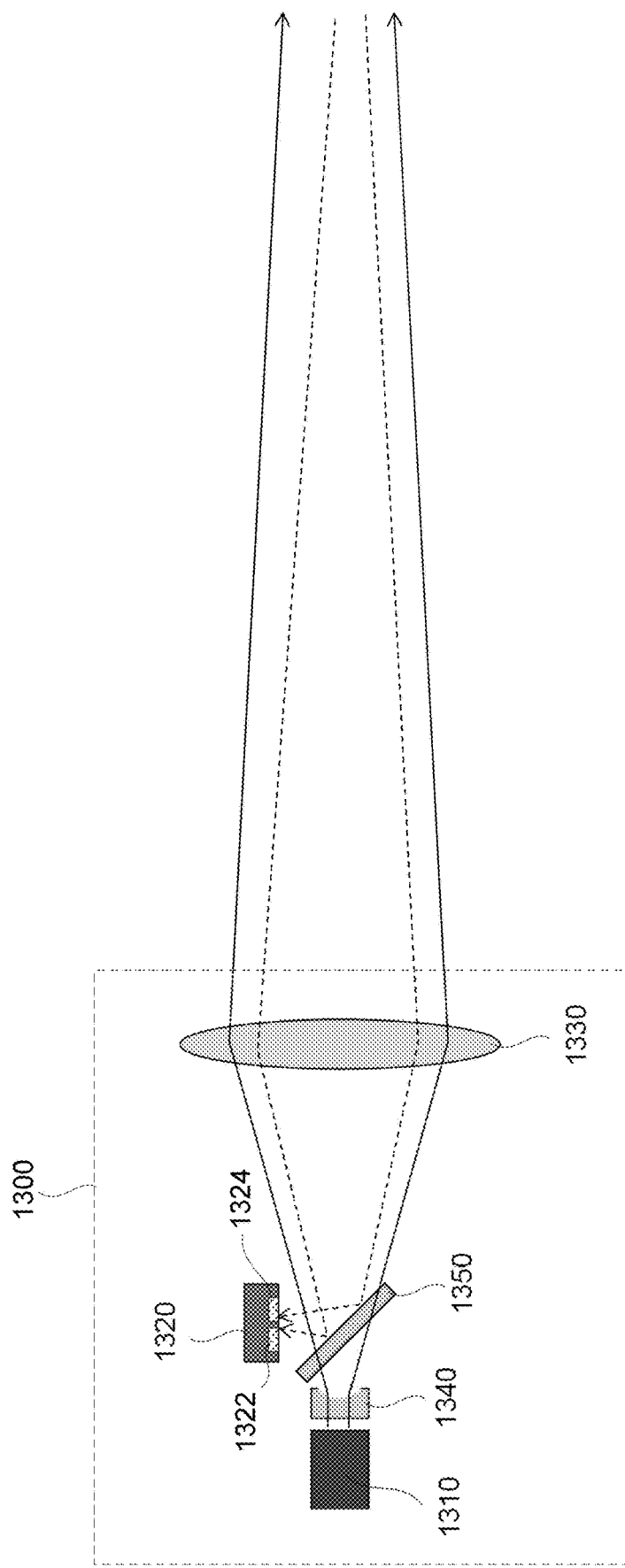
FIG. 13 illustrates schematically a lidar system according to some embodiments of the present invention.

FIG. 13 illustrates schematically a lidar system 1300 according to some embodiments of the present invention. The lidar system 1300 include a laser source 1310 and a detector 1320. Instead of having separate emission lens and receiving lens as illustrated in FIGS. 1 and 9, the lidar system 1300 includes a single lens 1330 for collimating a laser beam emitted by the laser source 1310, as well as for focusing a return laser beam reflected off of one or more objects. The lidar system 1300 may include a beam splitter 1350 positioned between the laser source 1310 and the lens 1310. The beam splitter 1350 may be configured to partially transmit the laser beam emitted by the laser source 1310, and partially reflect the return laser beam toward the detector 1320.

In some embodiments, the lidar system 1300 may further include an optional cylindrical lens 1340 positioned in front of the laser source 1310. The cylindrical lens 1340 has a negative power, similar to the cylindrical lens 410 illustrated in FIGS. 4A and 4B. As described above in relation to FIGS. 4A and 4B, the cylindrical lens 1340 may result in a relatively symmetric far-field beam spot, as illustrated in FIG. 5D.

In some embodiments, the detector 1320 may include a plurality of photo sensors 1322 and 1324 arranged as an array, similar to the detector 920 illustrated in FIGS. 9, 10A, and 12A-12B. As described above in relation to FIG. 9, each photo sensor 1322 or 1324 may be configured to detect a respect portion of the return laser beam. By having both the cylindrical lens 1340 and the array detector 1320, the lidar system 1300 may achieve even better resolution than a lidar system that only includes a cylindrical lens or a lidar system that only includes an array detector.

Figure 14:
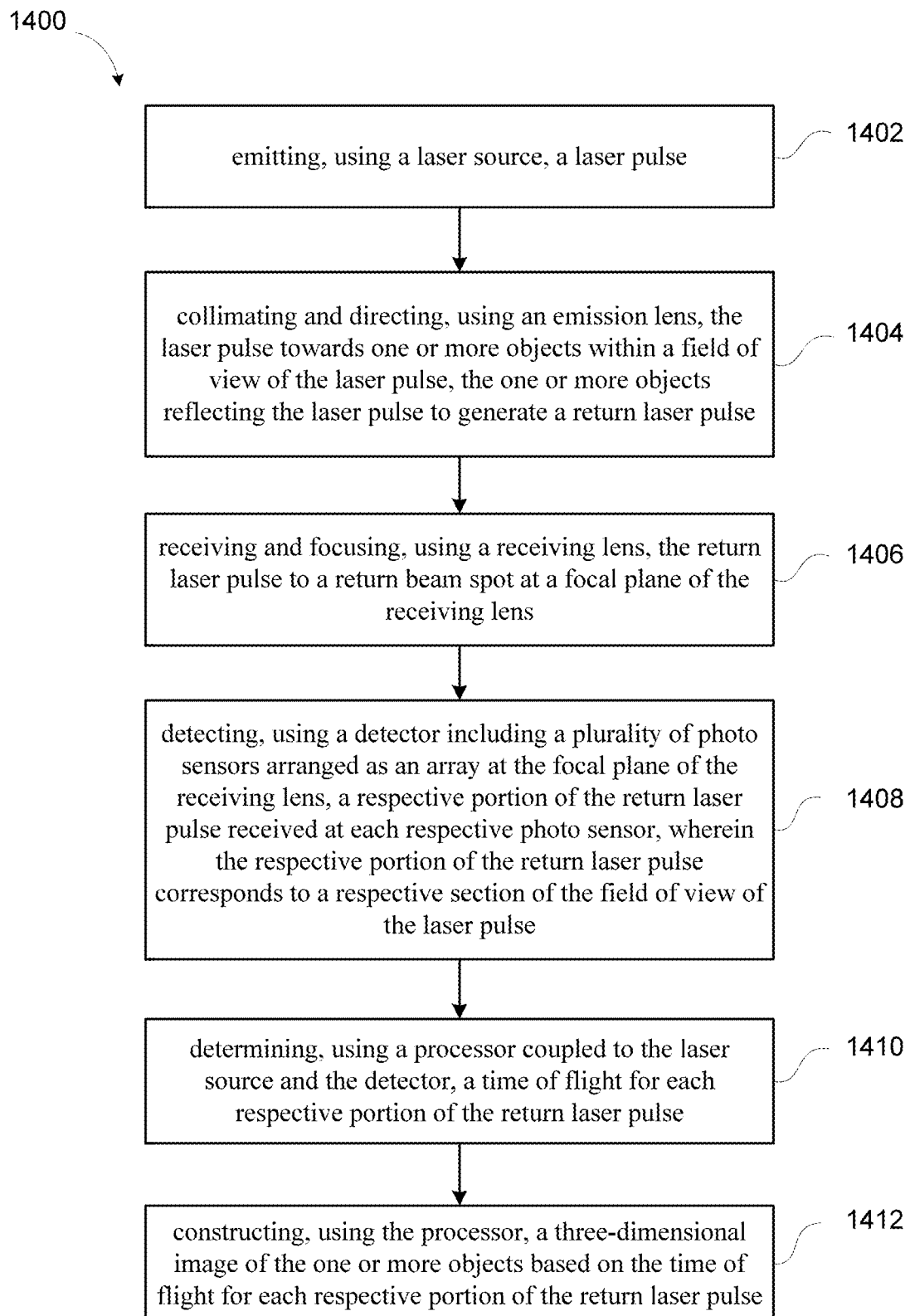
FIG. 14 shows a simplified flowchart illustrating a method of three-dimensional imaging using a lidar system according to some embodiments of the present invention.

FIG. 14 shows a simplified flowchart illustrating a method 1400 of three-dimensional imaging using a lidar system according to some embodiments of the present invention.

The method 1400 may include, at 1402, emitting, using a laser source, a laser pulse; and at 1404, collimating and directing, using an emission lens, the laser pulse towards one or more objects within a field of view of the laser pulse. The one or more objects may reflect the laser pulse to generate a return laser pulse.

The method 1400 may further include, at 1406, receiving and focusing, using a receiving lens, the return laser pulse to a return beam spot at a focal plane of the receiving lens; and at 1408, detecting, using a detector that includes a plurality of photo sensors arranged as an array at the focal plane of the receiving lens, a respective portion of the return laser pulse received at each respective photo sensor. The respective portion of the return laser pulse corresponds to a respective section of the field of view of the laser pulse.

The method 1400 may further include, at 1410, determining, using a processor coupled to the laser source and the detector, a time of flight for each respective portion of the return laser pulse; and at 1412, constructing, using the processor, a three-dimensional image of the one or more objects based on the time of flight for each respective portion of the return laser pulse.

In some embodiments, each respective photo sensor of the detector has a respective sensing area for receiving the respective portion of the return laser pulse. The plurality of photo sensors is arranged such that a total sensing area of the plurality of photo sensors substantially matches the return beam spot.

In some embodiments, the method 1400 may further include translating the laser source through a plurality of emission locations in an emission plane substantially perpendicular to an optical axis of the emission lens, and translating the detector through a plurality of detection locations in the focal plane of the receiving lens. Each respective detection location of the plurality of detection locations corresponds to a respective emission location of the plurality of emission locations. In some embodiments, each of the laser source and the detector is translated in one dimension or in two dimensions. In some embodiments, the laser source and the detector may be scanned in two directions in a Lissajous pattern. In some embodiments, the emission lens and the receiving lens are fixed while the laser source and the detector are being translated.

In some other embodiments, the method 1400 may further include translating the emission lens relative to the laser source in a plane substantially perpendicular to an optical axis of the emission lens; and translating the receiving lens relative to the detector in the plane synchronously with the translation of the emission lens. In some embodiments, each of the emission lens and the receiving lens is translated in one dimension or two dimensions. In some embodiments, the emission lens and the receiving lens may be scanned in two directions in a Lissajous pattern. In some embodiments, the laser source and the detector are also translated synchronously with respect to each other, while the emission lens and the receiving lens are being translated.

In some further embodiments, the method 1400 may further include translating the laser source and the detector synchronously in a first direction substantially perpendicular to an optical axis of the emission lens; and translating the emission lens and the receiving lens synchronously in a second direction orthogonal to the first direction and substantially perpendicular to the optical axis of the emission lens. One of ordinary skill in the art would recognize many variations, alternatives, and modifications.

It should be appreciated that the specific steps illustrated in FIG. 14 provide a particular method of performing three-dimensional imaging using a lidar system according to some embodiments of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added and some steps may be removed depending on the particular applications. One of ordinary skill in the art would recognize many variations, modifications, and alternatives.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

A recitation of "a", "an" or "the" is intended to mean "one or more" unless specifically indicated to the contrary.

Ranges may be expressed herein as from "about" one specified value, and/or to "about" another specified value. The term "about" is used herein to mean approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. When such a range is expressed, another embodiment includes from the one specific value and/or to the other specified value. Similarly, when values are expressed as approximations, by use of the antecedent "about," it will be understood that the specified value forms another embodiment. It will be further understood that the endpoints of each of the ranges are included with the range.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to explain the principles of the invention and its practical applications to thereby enable others skilled in the art to utilize the invention in various embodiments and with various modifications as are suited to the particular use contemplated.

What is claimed is:

1. A lidar system for three-dimensional imaging, the lidar system comprising:
    a laser source configured to emit a laser beam carrying an electromagnetic signal;
    an emission lens configured to collimate and direct the laser beam towards one or more objects within a field of view of the emission lens, the one or more objects reflecting the laser beam to generate a return laser beam;
a receiving lens configured to receive and focus the return laser beam to a return beam spot at a focal plane of the receiving lens;
a detector including a plurality of photo sensors arranged as an array at the focal plane of the receiving lens, each respective photo sensor having a respective sensing area and configured to receive and detect a respective portion of the return laser beam corresponding to a respective section of the laser beam; and
a processor coupled to the laser source and the detector, the processor configured to:
  determine a respective time of flight for each respective portion of the return laser beam detected at the respective photo sensor of the detector; and
  construct a three-dimensional image of the one or more objects based on the respective time of flight for each respective portion of the return laser beam.

2. The lidar system of claim 1 wherein the plurality of photo sensors are arranged such that a total sensing area of the plurality of photo sensors substantially matches the return beam spot.

3. The lidar system of claim 1 wherein the plurality of photo sensors is arranged as the array that is one-dimensional or two-dimensional.

4. The lidar system of claim 3 wherein the plurality of photo sensors comprises two photo sensors.

5. The lidar system of claim 1 wherein the emission lens and the receiving lens comprise a same lens.

6. The lidar system of claim 1 further comprising a scanning mechanism to scan the laser beam emitted by the laser source.

7. The lidar system of claim 6 wherein the scanning mechanism comprises a rotating frame, wherein the laser source, the emission lens, the receiving lens, and the detector are mounted on the rotating frame.

8. The lidar system of claim 6 wherein the scanning mechanism comprises a rotating mirror or a micro-electro-mechanical systems (MEMS) mirror configured to reflect the laser beam.

9. The lidar system of claim 6 wherein the scanning mechanism is configured to translate the emission lens and the receiving lens synchronously in a plane substantially perpendicular to an optical axis of the lidar system.

10. The lidar system of claim 6 wherein the scanning mechanism is configured to:
  translate the laser source relative to the emission lens in a plane substantially perpendicular to an optical axis of the lidar system; and
  translate the detector relative to the receiving lens in the plane in synchronization of the translation of the laser source.

11. The lidar system of claim 6 wherein the scanning mechanism is configured to:
  translate the laser source and the detector synchronously in at least a first direction in a plane substantially perpendicular to an optical axis of the lidar system; and
  translate the emission lens and the receiving lens synchronously in at least a second direction in the plane.

12. The lidar system of claim 1 wherein the laser beam comprises a laser pulse or a frequency-modulated continuous wave (FMCW).

13. A method of three-dimensional imaging, the method comprising:
  emitting, using a laser source, a laser pulse;
  collimating and directing, using an emission lens, the laser pulse towards one or more objects within a field of view of the emission lens, the one or more objects reflecting the laser pulse to generate a return laser pulse;
  receiving and focusing, using a receiving lens, the return laser pulse to a return beam spot at a focal plane of the receiving lens;
  detecting, using a detector including a plurality of photo sensors arranged as an array at the focal plane of the receiving lens, a respective portion of the return laser pulse received at each respective photo sensor, wherein the respective portion of the return laser pulse corresponds to a respective section of the laser pulse;
  determining, using a processor coupled to the laser source and the detector, a time of flight for each respective portion of the return laser pulse; and
  constructing, using the processor, a three-dimensional image of the one or more objects based on the time of flight for each respective portion of the return laser pulse.

14. The method of claim 13 wherein each respective photo sensor has a respective sensing area for receiving the respective portion of the return laser pulse, and the plurality of photo sensors is arranged such that a total sensing area of the plurality of photo sensors substantially matches the return beam spot.

15. The method of claim 14 wherein the return beam spot has a width in a first detector direction and a height in a second detector direction orthogonal to the first detector direction, the height being different from the width.

16. The method of claim 13 wherein the plurality of photo sensors is arranged as the array that is one-dimensional or two-dimensional.

17. The method of claim 13 further comprising:
  translating the laser source through a plurality of emission locations along at least a first direction substantially perpendicular to an optical axis of the emission lens; and
  translating the detector through a plurality of detection locations along at least the first direction, each respective detection location of the plurality of detection locations corresponding to a respective emission location of the plurality of emission locations, wherein the laser source and the detector are translated synchronously with respect to each other.

18. The method of claim 13 wherein each of the laser source and the detector is translated along two directions.

19. The method of claim 13 further comprising:
  translating the emission lens relative to the laser source along at least a first direction substantially perpendicular to an optical axis of the emission lens; and
  translating the receiving lens relative to the detector along at least the first direction, wherein the emission lens and the receiving lens are translated synchronously with respect to each other.

20. The method of claim 19 wherein each of the emission lens and the receiving lens is translated along two directions.

21. The method of claim 13 further comprising:
  translating the laser source and the detector synchronously in at least a first direction substantially perpendicular to an optical axis of the emission lens; and
  translating the emission lens and the receiving lens synchronously in at least a second direction substantially perpendicular to the optical axis of the emission lens.

22. A lidar system for three-dimensional imaging, the lidar system comprising:
- a laser source configured to emit a laser beam carrying an electromagnetic signal;
- a lens configured to collimate and direct the laser beam towards one or more objects within a field of view of the lens, the one or more objects reflecting the laser beam to generate a return laser beam, the lens further configured to receive and focus the return laser beam to a return beam spot at a focal plane of the lens;
- a detector including a plurality of photo sensors arranged as an array at the focal plane of the lens, each respective photo sensor having a respective sensing area and configured to receive and detect a respective portion of the return laser beam corresponding to a respective section of the laser beam; and
- a processor coupled to the laser source and the detector, the processor configured to:
  - determine a respective time of flight for each respective portion of the return laser beam detected at the respective photo sensor of the detector; and
  - construct a three-dimensional image of the one or more objects based on the respective time of flight for each respective portion of the return laser beam.

* * * * *